Patented Nov. 27, 1928.

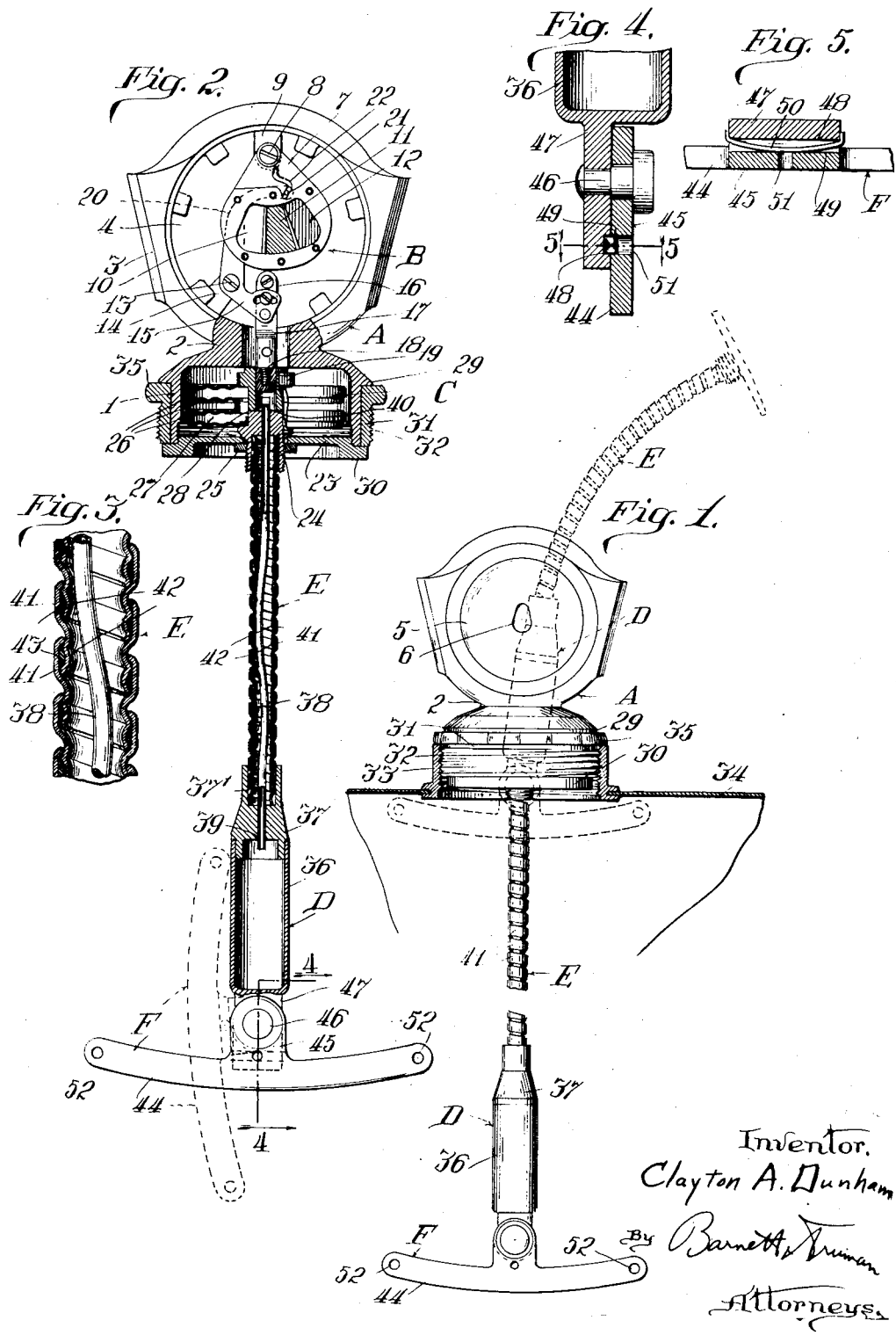

1,693,225

UNITED STATES PATENT OFFICE.

CLAYTON A. DUNHAM, OF GLENCOE, ILLINOIS, ASSIGNOR, BY MESNE ASSIGNMENTS, TO C. A. DUNHAM COMPANY, OF MARSHALLTOWN, IOWA, A CORPORATION OF IOWA.

TEMPERATURE INDICATOR.

Application filed May 1, 1926. Serial No. 106,028.

This invention relates to a temperature indicator for automobile engines, and more particularly to an indicator which gives visible signals to indicate to the driver of the car changes in engine temperature.

The principal object of this invention is to provide such an indicator which is supported on the filling spout of the automobile radiator, with the heat responsive or thermostatic element of the device suspended within the radiator so that it is entirely immersed in the cooling liquid, whereby a true indication of the actual temperature of this liquid will be given by the signalling device. In general, the temperature indicator comprises a housing mounted within the filling spout of the radiator and having a visible signal device mounted in its upper portion and an expansible diaphragm containing a closed fluid chamber mounted in its lower portion, the expansion of the diaphragm being adapted to operate the signalling device. A closed well containing an expansible heat responsive fluid is supported from the housing by a flexible tubular casing of sufficient length to permit the well to be immersed in the liquid within the radiator. A tube, enclosed within the tubular casing, is connected at its ends to the otherwise closed spaces within the wall and the operating diaphragm and forms a passage therebetween for the heat responsive fluid. This mechanism will be described more in detail hereinafter.

Another object is to provide improved means for removably supporting the indicator housing within the radiator spout.

Another object is to provide improved means for flexibly suspending the well from the housing.

Another object is to provide improved locking means for preventing the unauthorized withdrawal of the well from the radiator spout, thus preventing loss or theft of the temperature indicator.

Other objects and advantages of this invention will be more apparent from the following detailed description of one approved form of the device.

In the accompanying drawings:

Fig. 1 is a front elevation of the indicating mechanism mounted within the radiator spout which is shown in vertical section. In dotted lines is indicated the position of the mechanism when withdrawn to permit cooling liquid to be poured in through the filling spout.

Fig. 2 is a vertical central section through the device, this view being on a somewhat larger scale than Fig. 1.

Fig. 3 is an enlarged detail section through a portion of the connecting tubes.

Fig. 4 is an enlarged vertical section through the locking mechanism, the view being taken substantially on the line 4—4 of Fig. 2.

Fig. 5 is a horizontal section through the locking mechanism, taken substantially on the line 5—5 of Fig. 4.

In general, the mechanism comprises a housing A, in the upper portion of which the indicating or signalling mechanism B is mounted, this mechanism being operated by the heat responsive diaphragm indicated by C and mounted within the lower portion of the housing A. At D is indicated a well for holding a certain volume of a volatile fluid, this well being supported from the housing A by the tubular connections E, so that the well will normally be immersed within the cooling liquid in the automobile radiator. The locking mechanism for preventing loss or theft of the indicating device is indicated at F.

The housing A comprises a main casting, which is formed with a lower cylindrical portion 1 which encloses the expansible diaphragm C and is housed within the radiator spout, the portion 1 being connected by the reduced neck portion 2 with the enlarged upper casing 3 which houses the indicating mechanism B. The upper casing 3 may be given any desired, preferably ornamental conformation, but is preferably of a "watch case" design, having annular side walls surrounding the chamber 4 for the indicating mechanism. Suitable closures are provided for the front and rear of casing 3, the front closure 5 having a central opening 6 through which the signalling device is visible. The closure for the rear face of the casing will be provided with a light transmitting medium or window, preferably a prism adapted to collect and transmit light rays through the signalling device to illuminate the same and make it clearly visible. This portion of the indicating mechanism is not here shown, but is disclosed and claimed in my copending application, Serial No. 82,090, filed January 18, 1926.

The indicating mechanism B, in the example here shown, comprises a shutter 7 pivotally suspended at 8 from a lug 9 in casing 3. This shutter 7 serves as a frame or support for a plurality of transparent screens 10, 11 and 12, preferably of different colors, for example screen 10 may be white, screen 11 green, and screen 12 red. A bellcrank lever pivoted at 13 to a lug 14 in casing 3, has its shorter arm 15 connected by means of the adjustable link 16 with the upper end of stem 17, the lower end of the stem being connected at 18 with the thimble 19 which closes the upper end of the flexible diaphragm C, hereinafter described. As the diaphragm C expands, the stem 17 will be raised and this will rock the bellcrank about its pivot 13. The longer arm 20 of the bellcrank curves upwardly and is provided at its upper end with a pin 21 operating in an angular slot 22 in the upper portion of shutter 7. Within the range of normal operating temperatures for the engines, the central green screen 11 will be visible behind the sight opening 6 and the pin 21 will move back and forth along the central portion of the angular slot 22 which is struck substantially upon an arc about the pivotal center 13, so that movement of pin 21 in this central portion of the slot will effect no movement of the shutter 7. When the engine temperature falls below a lower critical temperature, the diaphragm C will completely contract and the pin 21 will be moved into the lower angular portion of slot 22, and shift the white screen 10 into position behind sight opening 6. This position of the parts is indicated in Fig. 2. When an upper critical temperature is reached, that is, when the engine is becoming overheated, the expansion of diaphragm C will have caused the pin 21 to move into the upper end portion of the angular slot 22 and shift the red screen 12 into position behind sight opening 6. It will be noted that the green screen 11 forms a normal running signal indicating that the engine temperature is satisfactory, and that the white and red screens are only brought into view when abnormal engine temperatures occur. This particular type of signal mechanism is described and disclosed more in detail and claimed in my co-pending application, Serial No. 54,743, filed September 5, 1925. As far as the particular subject matter of the present invention is concerned, other suitable types of temperature indicating mechanism could be used, it only being necessary that some form of signalling device, preferably visible, be mounted in the housing A, and operated from the heat responsive or thermostatic mechanism hereinafter described.

A closure plate 23 is screwed into the lower end of cylindrical housing 1, and a plug or thimble 24 is screwed centrally into closure 23 and held in place by a lock nut 25. The expansible diaphragm C is formed of a series of connected corrugated plates 26, the upper plate 26 being soldered, or otherwise sealed, to the plug or thimble 19, and the lower plate 26 being similarly secured to the plug 24, the two members 19 and 24, together with the flexible diaphragm plates 26 inclosing a chamber 27 which is adapted to be enlarged by the expansion of the volatile fluid therein, so as to elevate the movable plug or member 19 and thus actuate the operating stem 17. When the diaphragm is completely contracted, the plugs 19 and 24 will be in contact as indicated at 28.

In the annular groove formed about housing 1 between the upper outstanding flange 29 and the flange 30 at the outer edge of closure member 23, is mounted a rotatable collar 31, threaded at 32 to engage the interior threads in the filling spout 33 of the automobile radiator 34, the collar 31 taking the place of the usual filler cap, and being similarly knurled at its upper edge 35 to facilitate screwing the collar into the spout. It will thus be seen that the temperature indicator can be mounted in the radiator spout without bodily rotating the indicator mechanism, which bodily rotation of these parts would be inconvenient if not impossible on account of the well D and locking means F which are submerged within the radiator.

The well D comprises a comparatively thin hollow metallic casing 36, which is closed at its upper end by a plug 37. The well D is adapted to hold a certain volume of a volatile liquid. A small flexible, preferably metallic tube 38, has its lower open end 39 sealed in the plug 37, and its upper open end 40 sealed in the plug 24, whereby this tube 38 serves as a connecting passage between the otherwise closed chamber in the well D and the closed chamber in the flexible diaphragm C. Since the well D has a fixed volume, the expanding volatile fluid will pass through tube 38 into the flexible diaphragm C, whose volume is variable, and cause this diaphragm to expand, thus operating the indicating or signalling mechanism B. An outer flexible casing or armoring E supports the well D from the housing A, and thus relieves the inner tube 38 from all supporting stresses. This outer tubular casing, as best shown in Fig. 3, is preferably formed of a spirally wound strip of metal having an upper outer curved flange 41 and a lower inner curved flange 42, so that the flanges 41 and 42 of adjacent convolutions will interlock. A packing material 43 confined between the flanges serves to seal the tube against the entrance of liquid while at the same time sufficient sliding play is permitted between the flanges 41 and 42 to give the tube its desired flexibility. The lower end of this tubular casing is soldered or otherwise secured at 37' within a tubular extension at the upper end of plug 37. The upper end of the flexible casing E is similarly secured within the plug 24 in closure 23. The inner tube 38 is somewhat longer than the outer casing or armoring tube E, the inner tube 38 being preferably wound in the form of a helix of long pitch, as indicated in the drawings. This serves to remove any intensive strains from the tube 38 in case of bending, and insures that no portion of the well D and locking means F will be supported by this inner tube.

The locking mechanism F comprises a cross bar 44 of greater length than the inner diameter of filling spout 33, the cross bar 44 having a central upwardly projecting lug 45 which is pivoted by bolt 46 to a downwardly projecting lug 47 on the well 36. When the cross bar is in horizontal position, as indicated in solid lines in Fig. 2, a horizontal slot 48 in the lug 47 will mate with a corresponding slot 49 in the lug 45 on the cross bar. A flat bowed spring 50 is confined within the slot 48 as indicated in Fig. 5, and when the slot 49 mates with the slot 48, the spring 50 will spring or snap into the slot 49, thus locking the cross bar 44 in horizontally extending position. A hole 51 in the lug 45 permits the insertion of a suitable instrument to press back the spring 50 and permits the cross bar 44 to be turned up into the vertical position indicated in dotted lines in Fig. 2.

When the temperature indicator is initially placed in position within the radiator, the locking bar 44 will be moved to the vertical position indicated in dotted lines so that it may be passed, along with the well D, through the radiator spout 33. After these members are inserted, one end of the cross bar 44 may be engaged by a suitable instrument to swing same around to the horizontal position indicated in solid lines, Fig. 2, at which time the spring 50 will snap into place within slot 49 and lock the bar 44 in this position at right angles to the center line of well D and tube E. The housing A is now positioned within the filler spout by screwing the collar 31 into the spout. It will be noted that this is done without rotating the other parts of the assembled indicator device, and rotation of the locking device F would be awkward or impossible if this locking device contacts with the inner fittings of the radiator. In some radiators the vertical drop beneath the filling spout will be insufficient to permit the well D and locking device F to hang vertically and it will be necessary that they bend to one side. This may be done since it is not necessary to rotate these parts when the collar 31 is screwed into the spout 33. The rotatable collar 31 here shown is adapted for use with cars of the Ford type, wherein the radiator spout is interiorly threaded. In order to adapt the temperature indicator for use in cars where the filling spout is exteriorly threaded, the collar 31 may be provided with an outer interiorly threaded flange adapted to engage the spout.

When the device is in place, as noted above, the well D will be completely immersed in the cooling liquid, and the volatile fluid in this well will be immediately responsive to actual temperature changes of this liquid. The fluid will pass up or down through the inner tube 38 and cause an expansion or contraction of the flexible diaphragm C, the movements of which will be transmitted to the indicating mechanism B and thus made visible to the driver of the car by bringing one or another of the colored screens 10, 11 and 12, into view. While the type of indicating mechanism B here disclosed is preferred, obviously, other known forms of indicating devices could be operated from the stem 17 without departing from the essential features of this invention.

When it becomes necessary to add cooling liquid to the radiator, the collar 31 is unscrewed and the indicating mechanism pulled up to the position indicated in dotted lines in Fig. 1. It will be noted that the locking bar 44 prevents the complete separation of the mechanism from the radiator, so that it cannot be lost or easily stolen. However, an operator with the proper knowledge, and sufficient time, can remove the mechanism in order to transfer it to another car by inserting a suitably pointed instrument through the opening 51 and depressing the spring 50 so that cross bar 44 may be turned about its pivot 46. Openings 52 are provided in the ends of cross bar 44 whereby a suitable instrument may be hooked into one of these openings 52 in order to swing the cross bar to a vertical position when the spring 50 has been pushed back out of the slot 49.

I claim:

1. A temperature indicator for automobile engines, comprising a housing adapted to be supported by the radiator filling spout, indicating mechanism in the housing, and thermostatic mechanism for operating the indicator, comprising an expansible chamber within the housing, a well for a volatile fluid, a flexible tubular casing suspending the well from the housing so that the well will be immersed within the liquid in the radiator, and a flexible tube sealed to the expansible chamber and the well to form a fluid passage therebetween, the tube being housed within and protected from the liquid by the tubular casing.

2. A temperature indicator for automobile engines, comprising a housing adapted to be supported by the radiator filling spout, indicating mechanism in the housing, thermostatic mechanism for operating the indicator, comprising an expansible chamber within the housing, a well for a volatile fluid, a flexible tubular casing suspending the well from the housing so that the well will be immersed within the liquid in the radiator, and a flexible tube sealed to the expansible chamber and the well to form a fluid passage therebetween, the tube being housed within and protected from the liquid by the tubular casing and being somewhat longer than the tubular casing so that the entire weight of the well will be carried by the casing.

3. A temperature indicator for automobile engines, comprising a housing, means for mounting the housing in the filling spout of an automobile radiator, a hollow expansible diaphragm in the housing, an indicating mechanism in the housing, a stem connecting the diaphragm and the indicating mechanism whereby expansion or contraction of the diaphragm will change the indications given, a closed well for containing a volatile fluid, a flexible tubular supporting means whereby the well is suspended from the housing so as to hang immersed in the liquid in the radiator, and an inner tube enclosed freely within the tubular supporting means, sealed at its open ends to the diaphragm and the well and serving as a fluid passage therebetween.

4. A temperature indicator for automobile engines, comprising a housing, means for mounting the housing in the filling spout of an automobile radiator, a hollow expansible diaphragm in the housing, an indicating mechanism in the housing, a stem connecting the diaphragm and the indicating mechanism whereby expansion or contraction of the diaphragm will change the indications given, a closed well for containing a volatile fluid, a flexible tubular supporting means whereby the well is suspended from the housing so as to hang immersed in the liquid in the radiator, and an inner tube enclosed freely within the tubular supporting means, sealed at its open ends to the diaphragm and the well and serving as a fluid passage therebetween, the inner tube being somewhat longer than the tubular supporting means and formed as a helix of long pitch.

CLAYTON A. DUNHAM.